United States Patent [19]
Dyko et al.

[11] Patent Number: 5,956,708
[45] Date of Patent: Sep. 21, 1999

[54] INTEGRATION OF LINK GENERATION, CROSS-AUTHOR USER NAVIGATION, AND REUSE IDENTIFICATION IN AUTHORING PROCESS

[75] Inventors: Denise Y. Dyko, Millbrook; Christopher J. Hastings, Rhinebeck, both of N.Y.; Richard Sobiesiak, Willowdale, Canada; Ronald A. Wendt, Red Hook, N.Y.

[73] Assignee: International Business Machines Corporation, Armonk, N.Y.

[21] Appl. No.: 08/813,026

[22] Filed: Mar. 6, 1997

[51] Int. Cl.⁶ .................................................. G06F 17/30
[52] U.S. Cl. .............................. 707/3; 707/100; 707/501; 707/511
[58] Field of Search ................................ 707/3, 100, 511, 707/501

[56] References Cited

U.S. PATENT DOCUMENTS

| | | | |
|---|---|---|---|
| 4,502,766 | 3/1985 | Ito | 351/206 |
| 4,559,572 | 12/1985 | Kumasaka et al. | 360/110 |
| 4,905,163 | 2/1990 | Garber et al. | 706/55 |
| 5,367,621 | 11/1994 | Cohen et al. | 707/501 |
| 5,506,937 | 4/1996 | Ford et al. | 706/11 |
| 5,594,857 | 1/1997 | King et al. | 345/352 |
| 5,597,312 | 1/1997 | Bloom et al. | 434/362 |
| 5,655,130 | 8/1997 | Dodge et al. | 707/511 |
| 5,677,835 | 10/1997 | Carbonell | 704/8 |
| 5,768,578 | 6/1998 | Kirk et al. | 707/100 |
| 5,873,107 | 2/1999 | Borovoy et al. | 707/501 |

OTHER PUBLICATIONS

"The Role of A Group Centered Approach In The Development of Computer Supported Collaborative Design Technologies", by McNeese et al., Proceedings of the Human Factors Society 36th Annual Meeting Innovations for Interactions 1992, P867–71, vol. 2.

"Design Considerations for Teclecommunications–Supported Cooperative Learning Environments: Concept Mapping as a Telecooperation Support Tool" by Heeren & Collis, Journal of Educational Multimedia & Hyper–media, 1993, 4 (2), pp. 107–127.

"A Model of Knowledge Based Information Retrieval with Hierarchical Concept Graph" by Y.W. Kim & J.H. Kim, Journal of Documentation, vol. 46, No. 2, Jun. 1990. pp. 113–136.

"Identifying Design Requirements Using Integrated Analysis Structures" by Snyder et al., 1991 IEEE, pp. 786–792.

*Primary Examiner*—Paul R. Lintz
*Attorney, Agent, or Firm*—William A. Kinnaman, Jr.; Cantor Colburn LLP

[57] ABSTRACT

A process for professional authoring of information about structured domains (i.e., not including fiction) by which authors, as an integral part of the authoring process, provide the data needed to (1) enable intelligent user navigation between the work of different authors without the need for predefined links; (2) enable searches for information based on user context; and (3) identify reuse candidates before information is written and, therefore, minimize duplication. Authors develop concept maps to reflect the structure of the domain rather than the structure of the documentation; define the user context to which a concept map applies; resolve topic intersections between concept maps; define query attributes for articles to be developed; and resolve article intersections identified by means of intersecting query attributes. Computer programs support concept map development, the identification and analysis of topic and article intersections, and association of the data for exploitation in a user interface.

13 Claims, 12 Drawing Sheets

*TITLES OF ARTICLES AND MAPS PROVIDED FOR COMPREHENSION OF EXAMPLE

**ELEMENT, LEVEL, AND SERVICE CONTEXT FILTERS OMITTED FOR SIMPLICITY

ARTICLES

| ARTICLE ID | TOPIC | INFO TYPE | MAP ID | TITLE OF ARTICLE* | AUTHOR |
|---|---|---|---|---|---|
| 010 | LAN | INTRO | M1 | "WHAT IS A LAN?" | ANN ARTHUR |
| 011 | LAN | INTRO | M2 | "WHAT IS A LAN?" | A. RITER |
| 012 | LAN | PROCESS | M1 | "HOW A LAN WORKS" | ANN ARTHUR |
| 021 | LAN | EXAMPLE | M1 | "EXAMPLE OF A LAN CONFIGURATION" | ANN ARTHUR |
| 021 | LAN | OVERVIEW | M2 | "THE ROLE OF A LAN IN A SYSTEM/390 MICROPROCESSOR COMPLEX" | A. RITER |
| 022 | LAN | EXAMPLE | M2 | "EXAMPLE OF A LAN TO JOIN S/390 MICROPROCESSORS" | A. RITER |

\* TITLES OF ARTICLES PROVIDED FOR COMPREHENSION OF EXAMPLE

FIG.5

INTEGRATION OF LINK GENERATION, CROSS-AUTHOR USER NAVIGATION, AND REUSE IDENTIFICATION IN AUTHORING PROCESS

BACKGROUND OF THE INVENTION

1. Field of the Invention

This invention relates to authoring systems and processes, that is, the use of computer systems and affiliated authoring methods to create information.

2. Description of Related Art

An authoring system is a computer program or a set of computer programs that supports the process of developing information.

A prime objective of any authoring system or process is to provide search and navigation facilities that help readers find topics of interest. Some authoring systems develop these search facilities after the information is authored. For instance, some authoring systems rely on information retrieval techniques that find information based on the occurrence of a word or phrase in the text. They use computer programs to create the search facility after the author has created the body of information. However, readers find it difficult to retrieve information that fits their needs, since the occurrence of words or phrases can appear in many contexts that are not apropos.

Other authoring systems provide the ability for an author to attach keywords or index entries to a piece of information. Readers search for information through index lookup. This technique suffers from two general problems: (1) the author must have the foresight to identify important keywords or index entries, which is not always possible or practical to do; (2) the same keyword or index entry may end up being used to point to pieces of information in differing contexts, making it difficult for readers to find information relevant to their needs.

In general, the first two authoring system types discussed fail to capture important semantic data about the context in which a piece of information is relevant and useful to a reader.

Other online authoring systems make search facility creation an integral part of the authoring process and also capture important semantic data about the reader's context, but fail to provide a consistent, rigorous method that guides the creation of these search facilities. For instance, hypermedia systems often use graphical mapping techniques and linking mechanisms to communicate the structure of the body of the information in the hypermedia database. However, the author is free to use these mapping techniques and links as desired, so the structure of the information revealed to readers is what the author envisioned, not what is obvious or natural to the readers. Additionally, as information changes over time, it becomes enormously difficult to maintain such a structure of information links due to (1) the idiosyncratic nature of the original structure, and (2) the fact that these links are usually integrated into the body of the information itself, making it difficult to locate links that must change. The result for the reader is a phenomenon called "lost in hyperspace," in which the reader becomes disoriented by the structure of the hypermedia, or, worse, encounters information links that fail.

As an information corpus becomes large, several authors are needed to create the information collaboratively. Some authoring systems support such collaboration. For instance, they may allow the sharing of computer files, provide a common view of the work-in-progress, or a consolidated outline, in order to facilitate bringing the entire body of work into a coherent whole. Authors still have difficulty, however, in identifying the overall structure of the information corpus, and information that already exists and could be reused. Often some authoring work must be completed before authors can do the analysis and sometimes information must be reworked as a result.

No system of the prior art known to the inventors helps the author create, as an integral part of the authoring process, search facilities that gather semantic data about reader's context, while at the same time providing a consistent, rigorous method for structuring the information corpus so that authors can constructively collaborate in a nondisruptive manner as an integral part of creating information.

SUMMARY OF THE INVENTION

In accordance with the present invention, authors create concept maps that represent the structure of a domain being documented. Concept maps depict topics (subjects or tasks) and their relationships in a domain. Authors attach attributes to the concept maps, referred to herein as context filters, that represent a point of view on the domain. When the author creates an article for a topic in the concept map, that topic becomes the main topic of the article. Also, the article becomes associated with the point of view of the entire concept map. Authors also attach other attributes, herein referred to as query attributes, to the piece of information. One such query attribute is information type, which depicts the type of information (introduction, overview, description, etc.) in the article.

Computer programs implementing this invention help the author create concept maps and find duplicate topics in other authors' concept maps, thus allowing authors to know immediately whether another author is working on a common topic or whether a common topic exists. Computer programs also analyze potential duplicate pieces of information through query attributes. Authors are therefore able to identify information that is already written and able to be reused or adapted to their domain. Through this invention, authors can collaborate more easily, identify common information, and eliminate duplicate information. For readers, computer programs can also trace a common topic through many maps, allowing the reader to view how that topic and its affiliated information appear in differing contexts. Authors need not create additional information links for this to happen. In fact, there are no conventional hypertext links—information linkages are generated by the system through concept maps and query attributes.

BRIEF DESCRIPTION OF THE DRAWINGS

FIG. 5 illustrates the assignment of multiple sets of query attributes to a reused article.

DESCRIPTION OF THE PREFERRED EMBODIMENTS

General Description

Figure 1:
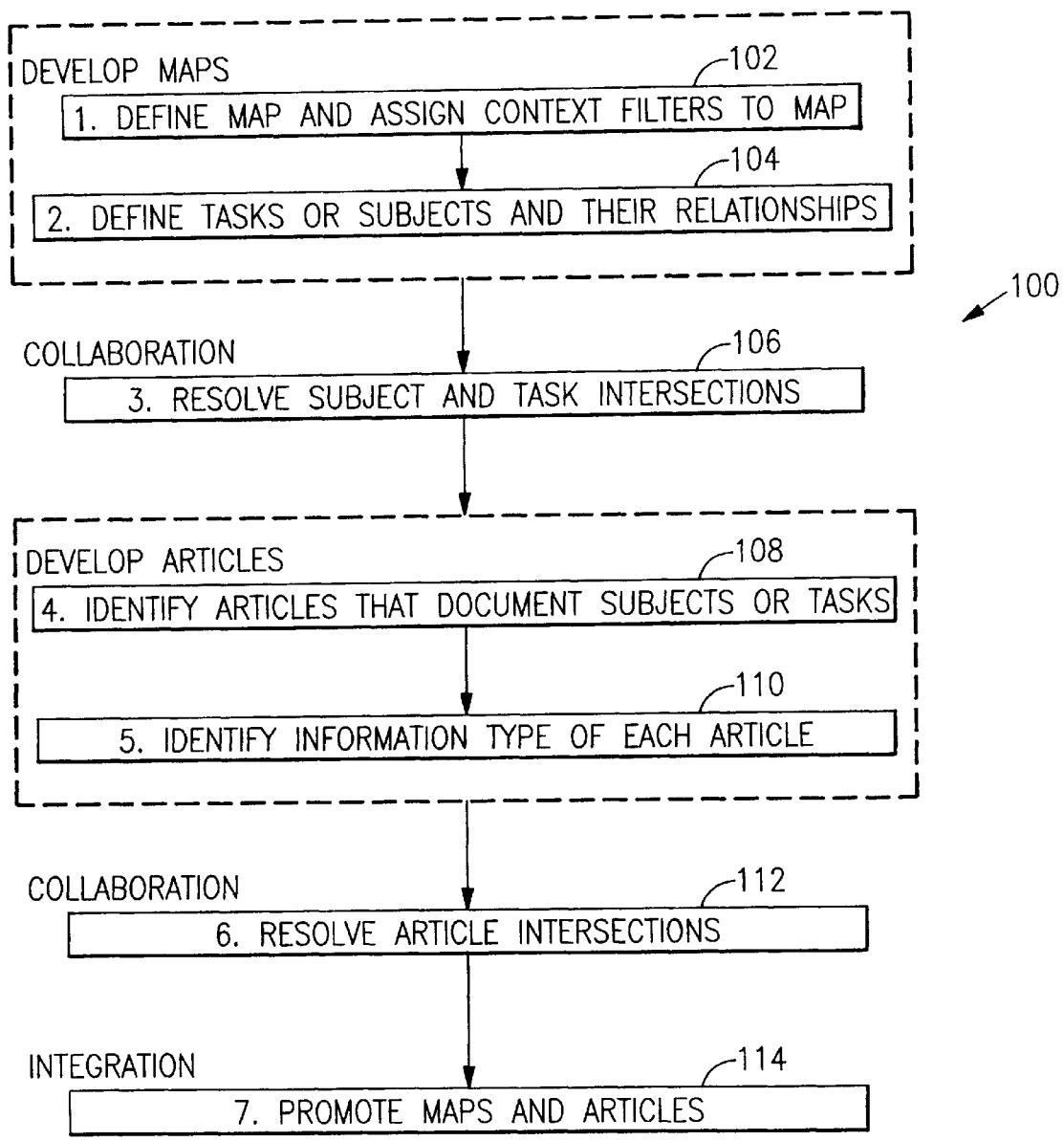
FIG. 1 illustrates the general authoring process of the present invention.

FIG. 1 illustrates the general procedure 100 of the present invention, comprising steps 1–7 (102–114). Steps 1–6 can be done in parallel and iteratively. The division of these steps is meant to articulate the features of this invention, not to imply a rigid sequence where one step must be completed before the next step can be started.

The following describes each general step. Subsequent sections describe two embodiments of the general process.

Step 1: Define Concept Map and Assign Context Filters to Map (102): A concept map is a graphical depiction of the domain being documented, identifying topics of interest to a reader and the relationships between the topics. A concept map is not a hypertext link map. A concept map identifies the structure of the domain, not the structure of documentation about that domain. It identifies topics, not articles (information units) describing those topics. A topic in a concept map might have, at the end of the authoring process, none, one, or many articles of information written about that topic.

Context filters associated with a concept map characterize the users who would be interested in the domain depicted in the map. The contents of a map, like the contents of a document, depend on who the user is, what the user does, and what the user has. For example, the contents of a map for a biologist who is studying intergeneric breeding in the orchid family would be different from the contents of a map for an amateur gardener who is growing orchids on a windowsill.

The selection of appropriate context filters depends on the overall domain. For the computer documentation supported by the two embodiments, the context filters are:

1. Product, product release, and product service level.
2. Element, element release, and element service level. (An element is similar to a component. For OS/390™, the exemplary subject of the first embodiment, elements represent programs that were formerly available as separate products but are now included in OS/390.)
3. Major Task Group. Major task groups, such as "installation" and "operation," have been commonly used to organize computer documentation.
4. Audience.

The following table identifies sample context filter values that are used for the domain of computer software in both embodiments of this invention:

TABLE 1

Common Context Filter Values Used for Computer Documentation

| CONTEXT FILTER | SAMPLE VALUES FOR CONTEXT FILTER | SYMBOL FOR VALUE (USED IN FIRST EMBODIMENT) |
| --- | --- | --- |
| Product | OS/390 | &os390. |
| Element | MVS ® and Parallel Sysplex ™ | &bcp. |
| | OpenEdition ® System Services | &oess. |
| | OpenEdition Application Services | &oeas. |
| | OpenEdition DCE Base Services | &oedce. |

TABLE 1-continued

Common Context Filter Values Used for Computer Documentation

| CONTEXT FILTER | SAMPLE VALUES FOR CONTEXT FILTER | SYMBOL FOR VALUE (USED IN FIRST EMBODIMENT) |
| --- | --- | --- |
| | OpenEdition DCE Distributed File Service | &oedfs. |
| | RMF ™ | &rmf. |
| | OS/390 Security Server | &sec. |
| | DFSMSdfp ™ | &smsdfp. |
| | DFSMShsm ™ | &smshsm. |
| | DFSMS/MVS ® Network File System (NFS) | &smsnfs. |
| | VTAM ® | &vtam. |
| Audience | systems programmer | &sp. |
| | application programmer | &ap. |
| | administrator | &adm. |
| | database administrator | &dbadm. |
| | security administrator | &secadm. |
| | network administrator | &netadm. |
| | operator | &op. |
| | operations analyst | &opa. |
| Major Task Group | evaluation | &eval. |
| | installation | &install. |
| | administration | &admn. |
| | database administration | &dbadmn. |
| | security administration | &secadmn. |
| | network administration | &netadmn. |
| | operation | &opn. |
| | customization | &cust. |
| | application programming | &apgm. |
| | diagnosis | &diag. |
| | end use | &use. |

The author defines a concept map by naming it and assigning values to the defined context filters. For example, an author defines a map related to "installing and customizing catalogs in OS/390" (the name of the map, reflecting a subset of the domain) for "system programmers" (the audience) responsible for "installation" and "customization" (the major task groups) for "OS/390 Release 3" (the product and release level).

In both embodiments, a set of predefined context filter values (that can be updated to accommodate, for example, new products) are used by all authors.

Step 2: Define Tasks or Subjects and Their Relationships (104): A topic in a concept map can be either a subject or a task (something the user wants to do). The author identifies tasks or subjects and their relationships that are of interest to the reader within the context of the map definition.

In the disclosed embodiments, a single map can contain only subjects or only tasks. A concept map, therefore, is either a subject map or a task map. All subjects or tasks within a single map must be related.

Figure 2:
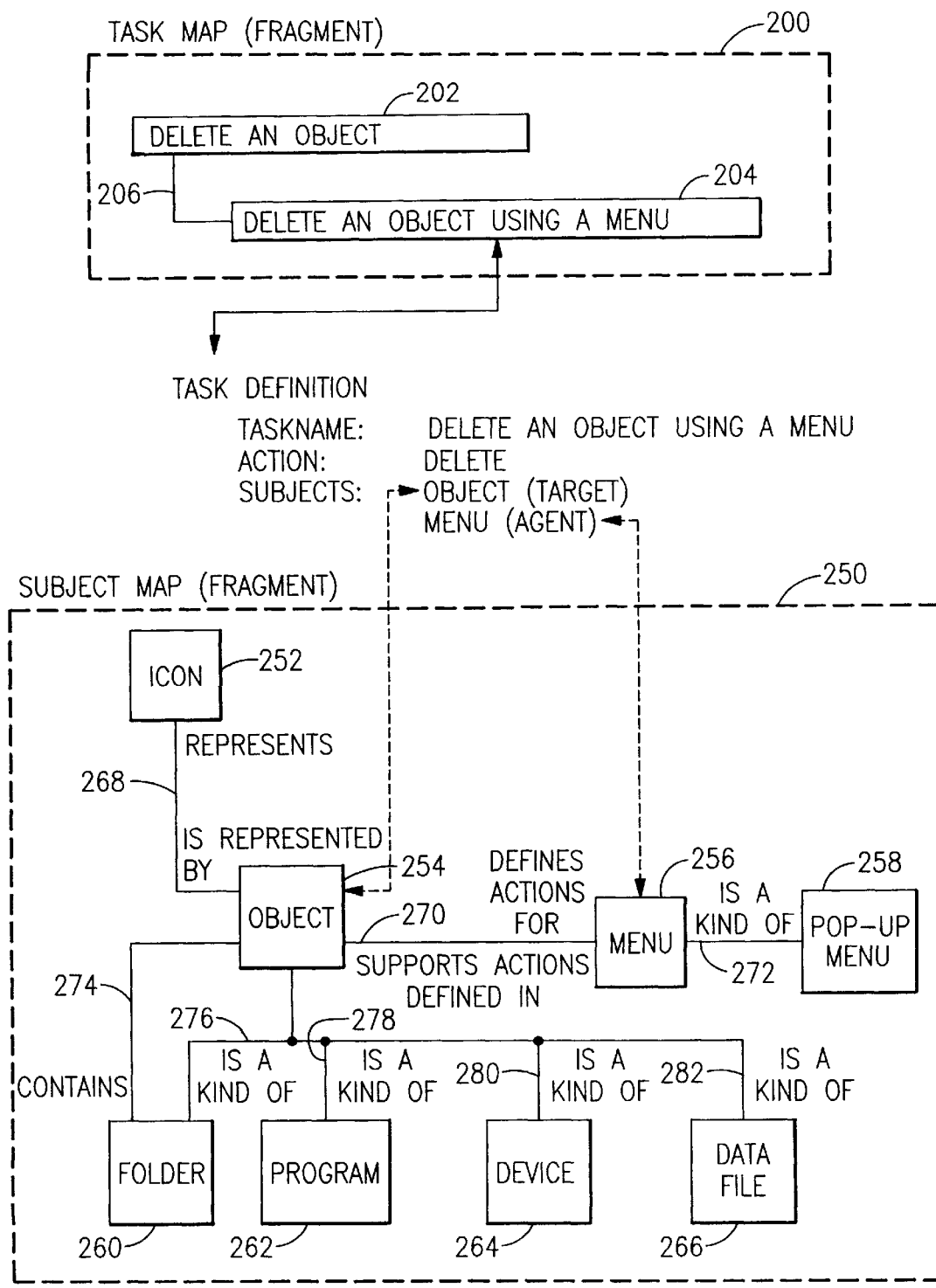
FIG. 2 illustrates how subject maps and task maps are related via task definitions.

FIG. 2 shows as exemplary concept maps a task map 200 and a subject map 250. Task map contains two tasks 202, 204 having a hierarchical relationship 206, while subject map 250 contains a plurality of subjects 252–266, respective pairs of which have various relationships 268–282.

The author defines subjects by assigning each subject a name. The author defines tasks by defining:

1. The name of the task (for example, "define aliases for a user catalog").
2. The action(s) involved in the task. This is the verb (or verbs) in the task name (for example, "define" in the task name "define aliases for a user catalog").
3. The subject(s) involved in the task (for example, "alias" and "user catalog" in "define aliases for a user catalog"). The author further identifies subjects based on their role in the task:

a. target subject(s): the subject that receives the action. A target subject must be identified.
b. agent subject(s): the subject used to take the action against the target. Identification of an agent subject is optional for a task.
c. other subject(s): subjects involved in the task in roles other than a target or agent role. Identification of other subjects is optional for a task.

Subject maps and task maps are related to each other via the identification of subjects involved in tasks in the task definition. Thus, as shown in FIG. 2, task 204 ("delete an object using a menu") in task map 200 has a target subject ("object") that matches subject 254 ("object") and an agent subject ("menu") that matches subject 256 ("menu") in subject map 250. Identification of subjects involved in a task provides the means of navigating between subject maps and task maps.

Subjects are related to each other in one of three ways:
1. Group-member relationships. In object-oriented terminology, these relationships are also known as generalization-specialization or supertype-subtype relationships.
2. Whole-part relationships. In object-oriented terminology, these relationships are also known as aggregation relationships.
3. Garden variety relationships. These are any relationships that are neither group-member nor whole-part relationships (for example, "I/O device CONNECTS TO port").

Tasks are related to each other as:
1. Group-member relationships.
For tasks, a member of a group is a task variant. For example:

| GROUP | MEMBER (TASK VARIANTS) |
| --- | --- |
| Design a garden | Design a vegetable garden |
| | Design a perennial border |
| | Design a low-maintenance garden |
| Define an I/O device | Define a printer |
| | Define a diskette drive |
| | Define a DASD |
| Delete an object | Delete an object using a menu |
| | Delete an object using a shredder |
| | Delete an object using the DELETE command |

Member tasks are related to a group task in one of the following ways:
a. The target subject of a group task (for example, garden) and the target subject of a member task (for example, vegetable garden) are themselves related in a group-member relationship (a vegetable garden is a kind of garden).
b. The tasks vary by the agent subject used to accomplish them (for example, menu, shredder, or DELETE command used to delete an object).

In general, information written about a group task can be inherited by the member tasks.
2. Whole-part relationships.
For tasks, a part is a subtask. For example:

| WHOLE | PARTS (SUBTASKS) |
| --- | --- |
| Design a garden | Identify climate zone |
| | Test soil |

| WHOLE | PARTS (SUBTASKS) |
| --- | --- |
| | Determine intended use of garden |
| | Choose plants |
| Define an I/O configuration | Define the I/O devices |
| | Define the control units |
| | Define the channels |

Note that the full set of information to support accomplishing the whole task is an aggregation of the information that supports the part tasks (subtasks). This is a characteristic of whole-part relationships.

In addition, whole-part relationships can, optionally, be further qualified as:
a. Ordered relationships, where the subtasks must be done in a specific order.
b. Mandatory or conditional relationships, where a subtask is a required or optional step.

Step 3: Resolve Subject and Task Intersections Identified by Program (106): Key to enabling navigation across maps is identification of subject and task intersections: the existence of the same subject or the same task in multiple maps. This step involves identifying, resolving, and tracking subject and task intersections:

1. A program uses linguistic comparison to identify possible subject or task intersections.

A subject is considered a possible duplicate of another subject if the names of the subjects "match," based on the linguistic comparison. A task is considered a possible duplicate of another task if the task definitions match:
a. The action(s) defined by the two tasks match, based on a linguistic comparison
b. The subject(s) defined by the two tasks match, based on a linguistic comparison.

2. The author resolves the intersection by verifying whether each intersection identified by the program is indeed an occurrence of the same subject or task. It is possible, for example, that two subjects that are exact matches are not the same subject: "window" in OS/390 is different from "window" in OS/2®; or "Mars" in astronomy is different from "Mars" in mythology.

3. The program assigns an identifier to each unique subject or task and tracks subject and task intersections: each map in which a subject or task occurs.

In both embodiments, the data that defines subjects and tasks is stored in a relational database.

Step 4: Identify Articles That Document Subjects or Tasks (108)

Note: Steps 4 and 5 are usually done in parallel. Authors developing maps for existing documentation usually first identify an article that documents a task (step 4) and then determine the type of information provided by the article (step 5). Authors developing new information usually first determine the kinds of information they need to develop (step 5).

Authors identify existing articles or develop new articles about the subjects or tasks in a map. The article documents the subject or task from the point of view of the map, as expressed by the context filter values. For example, different articles could document the same task in two maps: one article documenting the task in a map intended for application programmers; one article documenting the task in a map intended for network administrators.

Not all tasks or subjects are necessarily supported by an article. (For example, the only information on a task might be provided on the subtasks of that task.) More than one article can also document a task within the same map, each article providing a different kind of information. In this step, the author is identifying from 0–n articles that document a subject or task within the context of a map.

Step 5: Identify Information Type of Each Article (110): For each article that documents a subject or task, the author identifies the type of information (for example, "introduction" or "reference") provided by the article.

The values for type of information can depend on the domain. Table 2 identifies information types implemented for computer documentation. All authors use the same set of information types for consistency in attributing the articles of information.

TABLE 2

Information Types Implemented for Computer Documentation

| ATTRIBUTE | ATTRIBUTE VALUES | SYMBOL FOR VALUE (USED IN FIRST EMBODIMENT) |
|---|---|---|
| Information Type | Introduction | &intro. |
| | Overview | &over. |
| | How it works | &works. |
| | Requirements | &reqs. |
| | Procedure | &proc. |
| | Example | &xmp. |
| | Scenario | &scen. |
| | Hints | &hint. |
| | Reference | &ref. |
| | Syntax | &syntax. |

Step 6: Resolve Article Intersections (112): At this point, the author has identified the following for an article of information:

1. The subject or task documented by the article
2. The map that includes that subject or task, which provides, via the context filters associated with the map, the context for the article: the product(s), element(s), audience(s) and major task group(s) to which the article applies
3. The type of information provided by the article.

Together, these three attributes of an article comprise the query attributes for an article: they identify the user queries that the article answers. For example, Table 3 below illustrates how a specific user query translates to query attributes and, via the map query attribute, with the context filters associated with the map.

TABLE 3

| USER QUERY | TRANSLATION TO QUERY ATTRIBUTES AND CONTEXT FILTERS |
|---|---|
| A SYSTEMS PROGRAMMER responsible for | value for AUDIENCE context filter |
| INSTALLING and CUSTOMIZING | values for TASK GROUP context filter |
| DFSMS ™ for OS/390 VERSION 1 RELEASE 3 is looking for an | value for ELEMENT context filter values for PRODUCT and PRODUCT LEVEL context filters |
| EXAMPLE of | INFORMATION TYPE of article |
| DEFINING A BASIC CATALOG STRUCTURE. | TASK documented by article |

Because the authoring system has trapped the data that defines the user query that an article answers, the system can identify different articles that answer the same user query by comparing their query attributes. The comparison is done based on information type and topic (subject or task) assigned to the article; the author can use the context filters associated with maps to control the scope on which the comparison is made.

Figure 3:
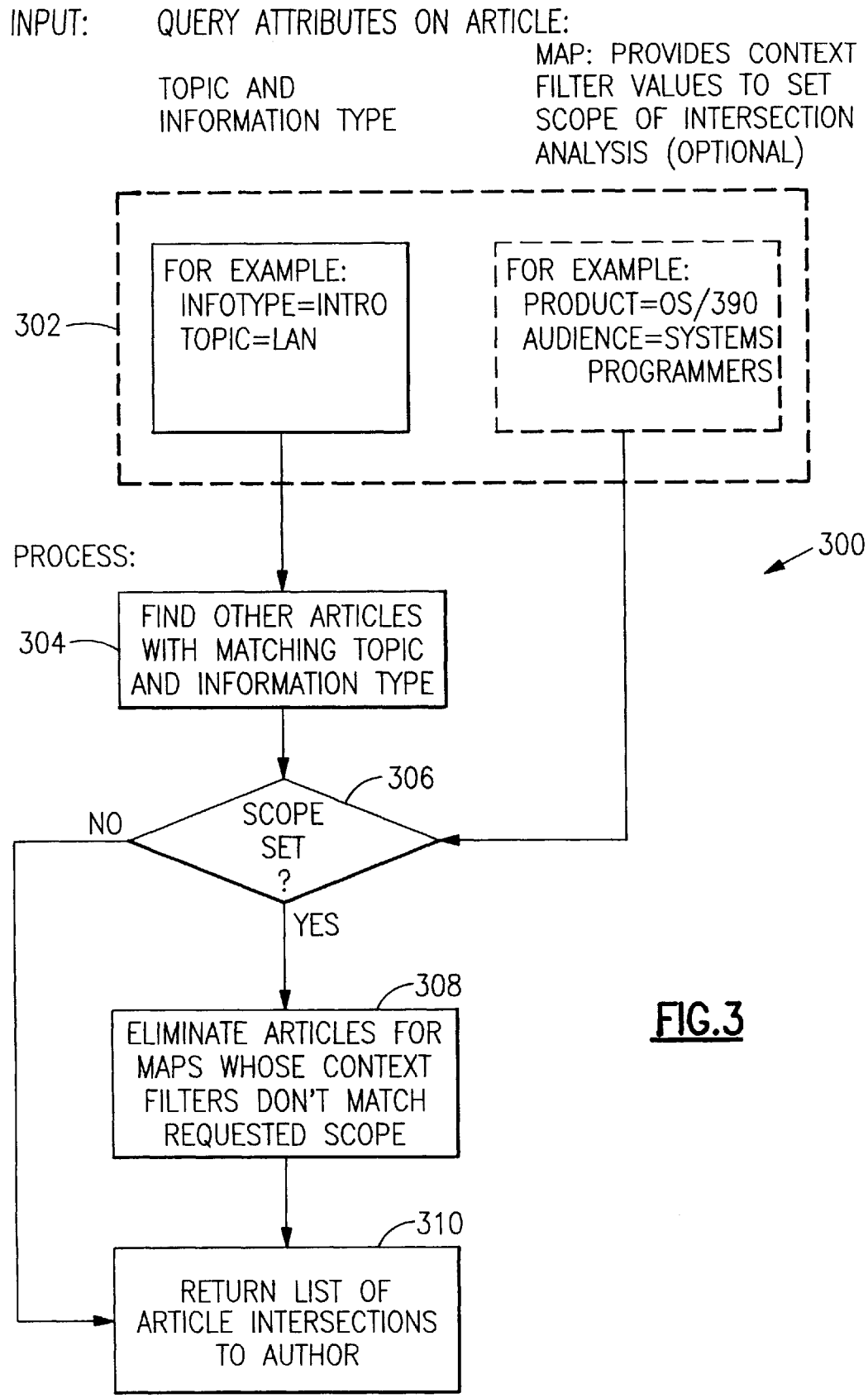
FIG. 3 illustrates the process for identifying article intersections.

FIG. 3 shows the general procedure 300 for identifying article intersections. An author first inputs a topic ("LAN") and information type ("intro") for a contemplated article to a program implementing the invention (step 302). Optionally, the author may specify context filters to further limit the search. In this case, the relevant context filters are product ("OS/390") and audience ("systems programmers"). The author may use as many context filters as desired to limit the scope of the search; he need not use all the context filters specified for a particular concept map.

The program then searches the database of existing articles for articles having the same topic ("LAN") and information type ("intro") as the contemplated article (step 304). If the author has chosen to further scope the set of articles using the context filters (step 306), then the program eliminates those articles whose context filters don't match the requested scope (step 308). Finally, the program returns a list of article intersections (i.e., articles matching the query attributes) to the author (step 310) for his resolution in a manner to be described below.

In both embodiments, query attributes and context filters on maps are stored in a relational database (e.g., a DB2® database). SQL queries identify attribute intersections between the work of different authors. Attribute intersections identify potential article intersections: multiple articles that provide the same kind of information about the same topic and that, therefore, might duplicate each other.

Figure 4:
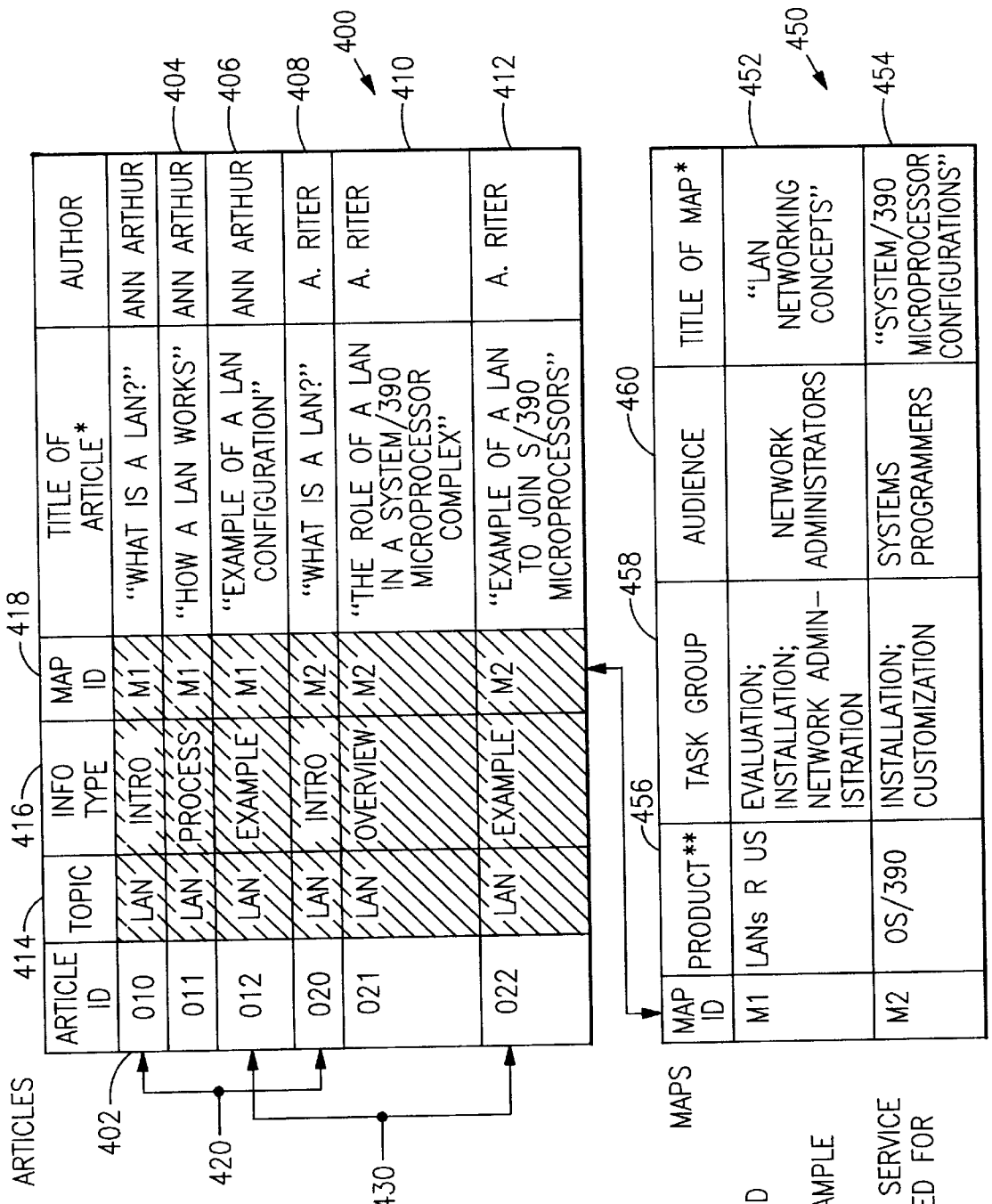
FIG. 4 illustrates the use of query attributes to identify reuse candidates.

FIG. 4 illustrates data stored for six articles about the subject "LAN" being developed by two writers; and the context filters associated with the maps in which the subject appears. More particularly, FIG. 4 shows an ARTICLES table 400 containing entries 402–412 for articles 010–022 and a MAPS table containing entries 452–454 for concept maps M1-M2. Columns 414–418 of ARTICLES table 400 contain the various query attributes, while columns 456–460 of MAPS table 450 contain the various context filters. (The title columns in both maps are depicted for the convenience of the reader of this specification and do not represent stored attributes; the author column in table 400 represents a stored attribute but not a query attribute.) There are two article intersections 420, 430: two articles 010, 020 with the information type "introduction" and two articles 012, 022 with the information type "example". Note that, if author "A. Riter" restricted the intersection analysis only to maps that also specify a product context filter value of "OS/390" (i.e., map M2), these intersections would not be found.

The authors determine if an article intersection actually does represent duplicated information. It can be valid to have multiple articles that provide the same type of information about the same topic; for example, because of distinctions in the context filters of maps to which the articles are attached. Whatever the resolution, the author provides appropriate input to the program specifying whether to reuse a previously created article.

In the example illustrated in FIG. 4, author A. Riter chooses not to reuse the example, because the example he needs to provide is specific to the OS/390 context. But he can reuse the introduction to the subject "LAN." When an author reuses an article, a set of query attributes is associated with the article for each occurrence of reuse. FIG. 5 illustrates the data stored in the database for the sample articles in FIG. 4, after the author A. Riter has chosen to reuse article 010. Article 010 is now associated with two sets of query attributes 402a, 402b.

Figure 6:
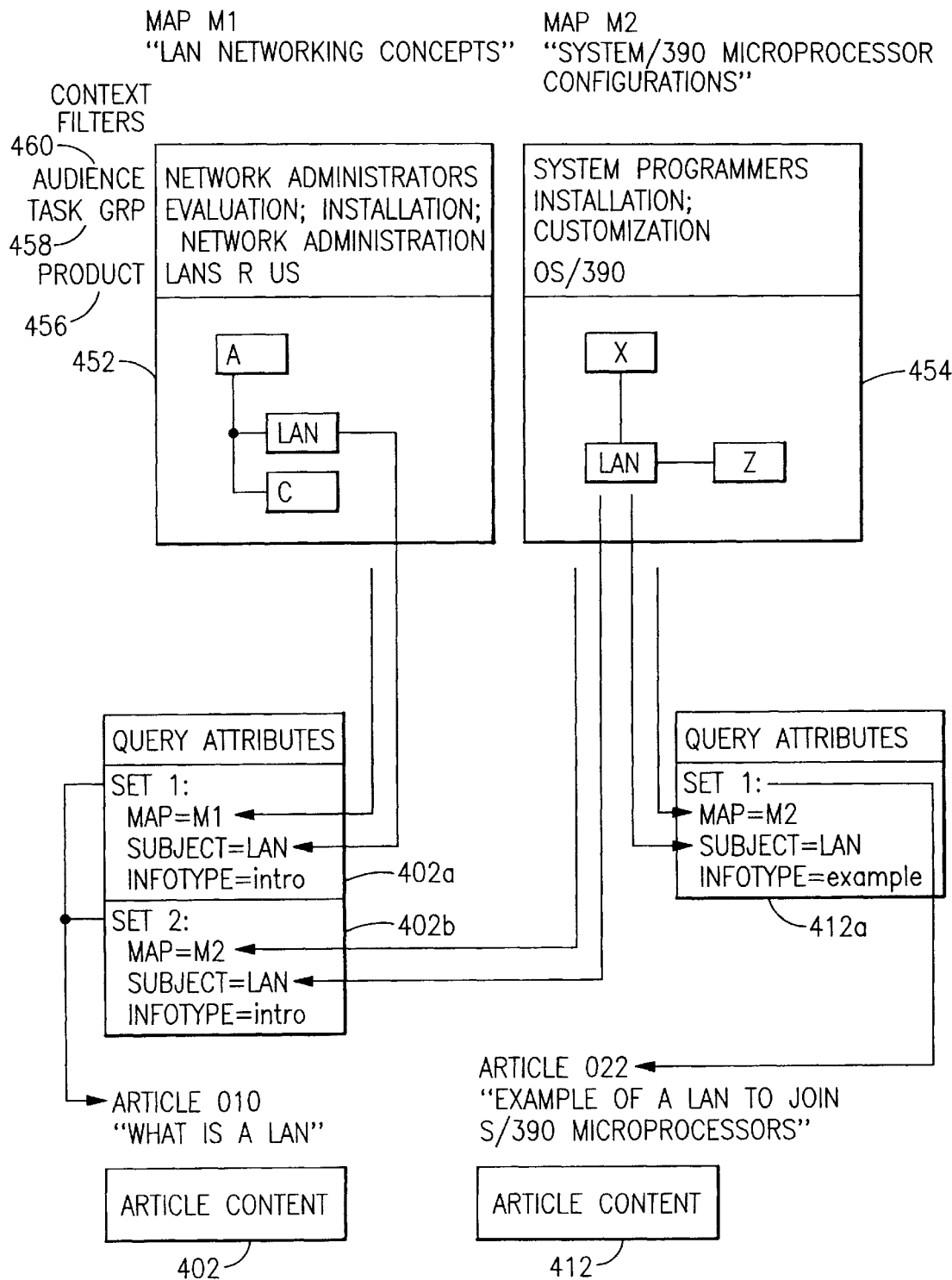
FIG. 6 illustrates the role of query attributes in associating articles with maps.

FIG. 6 further illustrates the interrelationships between the various data structures resulting from the reuse of article 010. As shown in FIG. 6, concept maps 452, 454 each have a set of context filters 456–460 associated therewith. Map 452 (M1) contains the subjects A, LAN and C, while map 454 (M2) contains the subjects X, LAN and Z. As further shown in FIG. 6, article 402 (010) has two sets of query attributes 402a, 402b associated therewith, while article 412 (022) has only the single set of query attributes 412a.

When an author is developing new information, the author assigns query attributes to an article to be developed; and identifies intersections with existing articles before writing a new article that potentially duplicates existing information. As soon as an author defines an article to be written, the system can present possible duplicates to the author. Identification of reuse candidates is integrated into the authoring system at the beginning of the writing cycle.

Step 7: Promote Maps and Articles (114): Authors promote their work when it is complete and ready to be integrated into a customer deliverable. The customer deliverable depends upon the embodiment. In both embodiments described in this specification, a relational database is used to integrate the data authors provide as part of the authoring process about their maps and articles. Integration of the physical maps and the articles themselves varies in the two embodiments.

Users Search for and Navigate Information via Concept Maps: Throughout the authoring process, authors collaborate as the system identifies intersections between their work. Otherwise, authors can work independently. The data they are providing, however, enables the work of different authors to be accessible to the user in a seamless fashion. Via a user interface that exploits the gathered data, users can search and navigate the body of information using the maps:

1. The user can set context filter values to set the scope of a search to include only maps that match the context filter values. Both embodiments implement this capability as user profiles.
2. The program searches for the search argument in the maps, not in all information associated with the maps. As a result, the number of "hits" is greatly reduced over full-text searches of the entire body of information, even if no context filters are set.
3. The user can navigate via the maps:
   a. From a topic that matches the search argument to other topics in a map via the relationships between topics.
   b. To other maps via topic intersections between the maps.
   c. Between subject and task maps via the task definitions. A user can ask to see tasks related to a subject; or navigate to maps that include the subjects involved in a task of interest.

Navigation via the maps allows a user to navigate via the structure of the domain, instead of via the structure of the documentation about that domain. The increased navigation makes the effectiveness of the search argument less critical and avoids what the authors of this invention call the "Goldilocks" syndrome, where a user enters a search argument that returns a hit list that is "too big;" tries again with a new search argument that returns a hit list that is "too small;" and tries again with still another search argument to try to obtain a hit list that is "just right."

Instead, the search argument is used to enter the maps, from which the user can navigate the maps instead of repeatedly trying to specify a more effective search argument.

4. The user is not limited to links authors have had the foresight to predefine. The disclosed authoring system supports serendipity in enabling connections between common topics. New information about common topics is automatically navigable with existing information by virtue of the authors confirming that topics are common.
5. The user can follow links from the maps to the information in a softcopy library without consciously selecting which book to open. The user need not be aware of the structure of a softcopy library to access it.

Once the user has followed a link to a softcopy book, however, the user can exploit all the traditional navigation associated with a softcopy book, such as scrolling, intra-book linking, and displaying the table of contents. The disclosed system supplements existing navigation rather than replacing it.

6. The labeling of links with information types provides a strong clue about the information a user will find at the end of a link. Predefined information types based on domain and used by all authors within that domain provide consistent use of clues.
7. The hit list from a search of maps provides more context for a user to judge the applicability of each hit than a hit list from a traditional softcopy book search. The hit list of topics (subjects or tasks) can include:
   a. The name(s) of the map(s) in which a topic is found
   b. Context filter values associated with the map(s) in which a topic is found
   c. An index to the results, built from the context filter values, information types of associated articles, and, for tasks, the definition of each task.

DESCRIPTION OF SPECIFIC EMBODIMENTS

The general process is shown in two embodiments:

1. The first embodiment integrates the authoring process herein disclosed into an existing authoring process that supports a large existing corpus of documentation in the form of BookManager® softcopy books.
2. The second embodiment is a new authoring process based upon the general process herein disclosed. The output of the new process can be transformed to match existing documentation deliverables but does not presuppose any specific documentation deliverables.

The key distinction between the first and second embodiments is their ability to support a large body of existing online documentation without the need to migrate the existing documentation. The first embodiment requires no migration of existing information. The second embodiment requires a migration effort to place existing documentation into the authoring system.

First Embodiment

Figure 7:
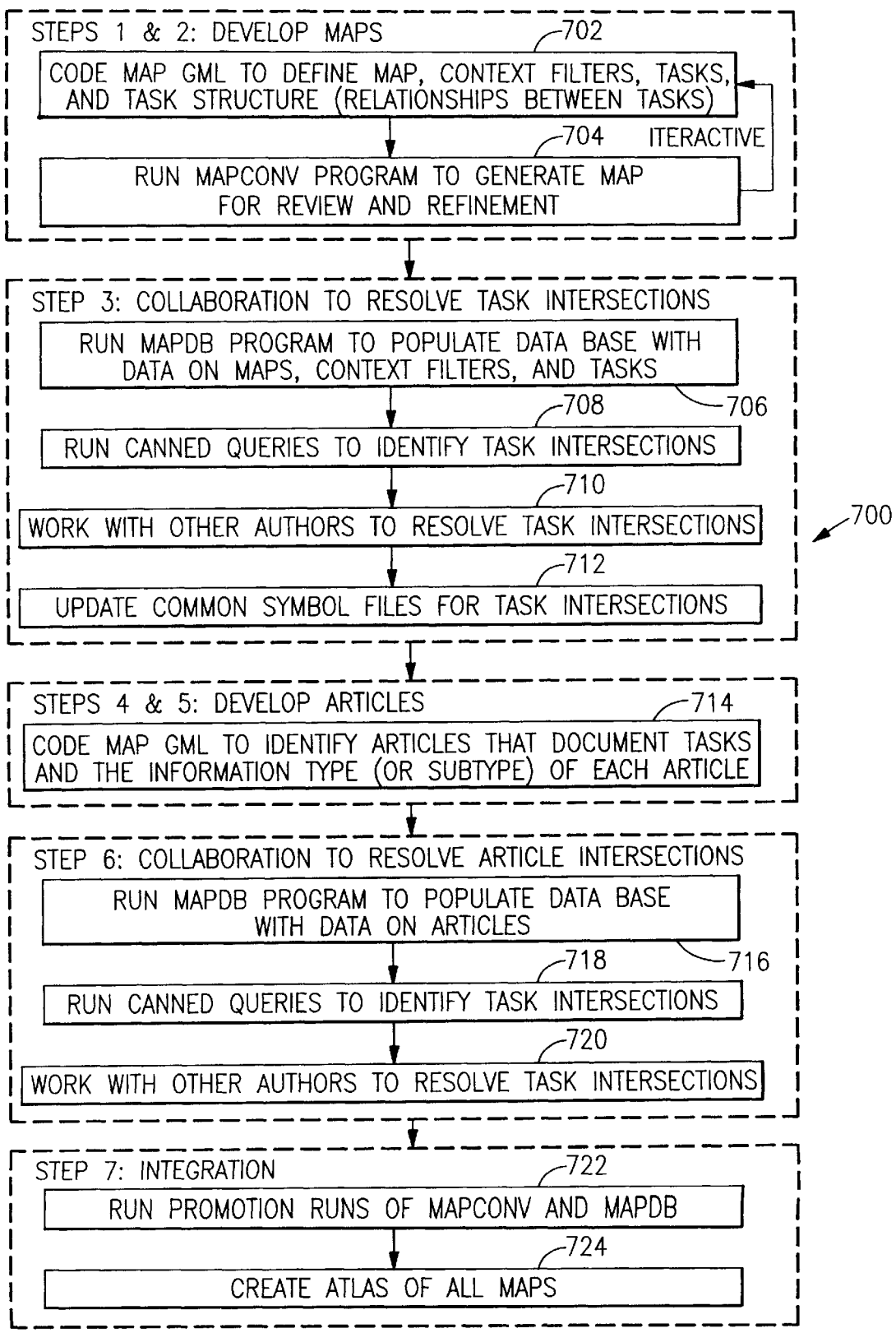
FIG. 7 illustrates the general authoring process as applied in a first embodiment.
Figure 8:
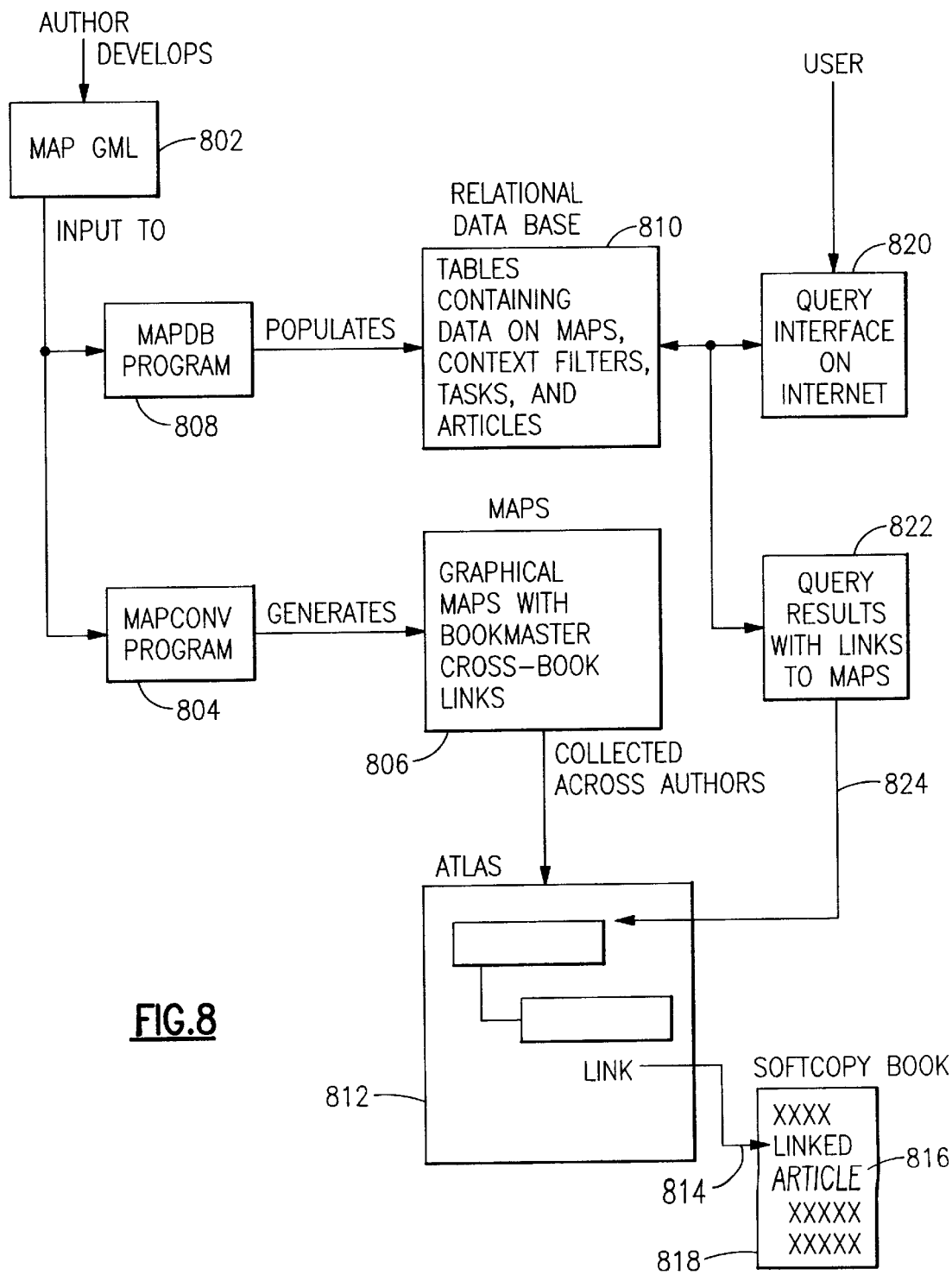
FIG. 8 illustrates the primary components of the first embodiment and their structure.

FIG. 7 shows the general procedure 700 as implemented in a first authoring system 800 shown in FIG. 8. Preferably, the components of authoring system 800 are implemented as software (i.e., a program of instructions on a machine-readable program storage device) executing on a suitable computer platform (not separately shown).

Authoring system 800 exploits the following existing tools in an existing information development process:

1. IBM® BookMaster®, a document markup language for text processing.
2. IBM BookManager, a product that builds an electronic book from IBM BookMaster documents (as well as documents in other markup, including html).
3. IBM BookServer, a product that allows BookManager softcopy books to be served to web browsers.

BookManager supports linking within and across documents based on BookMaster tags that define the links. BookMaster tags identify:

1. The source of the link, via the :link. and :elink. tags. The content between the :link. and :elink. tags becomes the highlighted text that is the source of the link.
2. The destination of the link:
   a. The document element (for example, a heading, table, or figure) that is the destination of the link, via a :ldesc. (link descriptor) tag. The link descriptor tag defines the identifier of the document element to be linked to.
   b. The document that contains the element to be linked to, via a :docdesc. (document descriptor) tag.

Links of this type are described further in Cohen et al. U.S. Pat. No. 5,367,621, the specification of which is incorporated herein by reference.

The existing tagging system for links is rich and sophisticated, but exploitation of article-to-article cross-book linking is limited by the authoring system: the difficulty of identifying other articles to link to in a library that may contain more than 500 softcopy books, the administrative cost of determining the identifiers to link to, the error-prone process of referencing identifiers from other authors' books, and the maintenance cost of maintaining the links as books are updated. Integration of the disclosed authoring process into the existing system overcomes these limitations.

Authoring system 800 integrates the authoring system of the present invention into the existing authoring system by defining a generalized markup language (GML) for maps and by providing programs 804 and 808 to process map the GML 802 developed by the author, as described below. (In the description that follows, "map GML" is used to refer to the markup language itself as well as to a particular map definition created using the markup language.) The markup language used contains tags of the general type :tagname. to identify fields of a text file, as is well known in the art. The map GML 802 contains the data necessary to:

1. Generate a graphical map 806 containing cross-book links 814 to articles 816 that describe the topics, using MAPCONV program 804. The described version of authoring system 800 contemplates task maps only.
2. Populate a relational database (e.g., a DB2 database) 810 with data describing the maps 806, topics and articles 816, using a MAPDB program 808.

Authors work within their assigned scope (a book 818 or a function that crosses a set of books) and code map GML 802 for their assigned scope: the book(s) and functions(s) for which they are responsible. The data the authors encode in the map GML 802 is the data the authors are currently working with (for example, identifiers within a book 818 the author is updating or developing).

Collaboration between authors occurs to resolve task intersections or article intersections, identified by running predefined queries against the database 810 built from the map GML 802. Integration of authors' work occurs by collecting all the graphical maps 806 from individual authors into a new kind of BookManager book 812 referred to herein as an Atlas. The program that 804 generates the maps 806 automatically converts the book-level data provided by authors into cross-book links 814 between the Atlas 812 and articles 816 in the authors' books 818.

A query interface 820 (accessible via, say, the Internet) allows users to build query results 822 from data in the relational database 810 that provide links 824 to maps 806 in the Atlas 812. From the Atlas 812, the user follows links 814 from the maps 806 to articles 816 in the softcopy books 818 making up the rest of the softcopy library.

Tables 4 and 5 below summarize the map GML used herein:

TABLE 4

| MAP GML TAG | USE OF TAG |
|---|---|
| :map.mapid | starts a map and provides mapid |
| :date. | copyright date for map |
| :author. | author name and net address |
| :docdesc. | id of book for BookManager cross-book linking |
| :natlang. | national language of map |
| :symbolfile. | name of symbol file; multiples allowed |
| DEFINITION OF CONTEXT FILTERS | |
| :product. | product to which map applies |
| :productlevel. | version and release level of product |
| :productservice. | service level of product |
| :element. | component of product to which map applies |
| :elementlevel. | component level to which map applies |
| :elementservice. | component service level to which map applies |
| :eelement. | end of element attribute set; multiples sets of element tags allowed |
| :eproduct. | end of product attribute set; multiple sets of product tags allowed |
| :audience. | audience(s) to which map applies; multiple values allowed |
| :taskgroup. | task group(s) to which map applies; multiple values allowed |

TABLE 5

| | DEFINITION OF TASK |
|---|---|
| :task.n | beginning of task; n identifies placement in task hierarchy |
| :taskname. | name of task |
| :action. | action(s) involved in task; multiple values allowed |
| :subject. | subject(s) involved in task; multiple values allowed |
| :mapref. | for tasks that are forward or backward references, the id of the map that contains the task |
| DEFINITION OF ARTICLES THAT DOCUMENT TASK | |
| :infotype. | type of information provided by an article that documents this task |
| :subtype. | further qualification of information type if more than one article for task has same information type |
| :hdrefid. | id of heading in book that documents task |
| :trefid. | id of table in book that documents task |
| :figrefid. | id of figure in book that documents task |
| :einfotype. | end of the definition of one or more articles that provide a specific type of information about the task; additional sets of :infotype. tags allowed for task (identifying different types of information for task) |
| END OF TASK DEFINITION; | |
| MULTIPLE SETS OF TASK TAGS ALLOWED | |
| :etask. | end of the definition of this task and its supporting documentation |
| END OF MAP DEFINITION | |
| :emap. | end of the definition of this map |

The following is a more detailed description of each step in the disclosed general process as implemented in authoring system 800.

Implementation of Step 1 (102) in Authoring System 800: In this step, authors code map GML 802 (FIG. 8) to define a concept map, including context filters, tasks and the relationships between tasks (step 702). Authors start a map using the :map. tag, in which they code a map id that will be used for cross-references between maps 806 that the author creates (when, for example, a task in one map is expanded as another map); and that will be used as the heading identifier of the map in the Atlas 812. Because each heading identifier within the Atlas 812 must be unique, authoring system 800 defines naming conventions for mapids.

Authors identify the book 818 that the map 806 applies to in the :docdesc. tag, an existing BookMaster tag. A :docdesc. tag placed at the beginning of a map definition establishes a default for all articles 816 referenced by the map 806. Authors, in step 4, will also have the option of specifying a :docdesc. tag for a specific article reference.

Authors assign context filter values in the following tags in the map GML 802:

1. :product., :productlevel., :productservice., and :eproduct. To assign more than one product to a map 806, the author enters multiple sets of product tags.
2. :element., :elementlevel., :elementservice., and :element. To assign more than one element to a map 806, the author enters multiple sets of element tags.
3. :audience. To identify multiple audiences to which a map 806 applies, the author specifies multiple values separated by commas.
4. :taskgroup, which identifies major task group. To identify multiple major task groups to which a map 806 applies, the author specifies multiple values separated by commas.

To ensure consistency, all values are coded as symbols, and the author identifies the relevant symbol files in the :symbolfile. tag (multiple :symbolfile. tags are allowed). The context filter symbol files, which contain information of the type shown in Table 1 above, are centrally maintained to achieve consistency in context filter values. New context filter values are defined by updating the symbol file that defines values for that context filter.

By convention, the name of a map 806 is the name of the root task (the task identified by the GML tag :task. 1).

Table 6 below illustrates the map GML 802 coded to define the context filters and map-level information for an actual task map 806 for OS/390.

TABLE 6

:map.smap01 frame=box dwidth=125
:date.March 1997
:natlang.U.S. English
:author.Chris Burgman
:docdesc id=idac100 num='SC26-4914'.
:product.OS/390
:productlevel.V1R3.0
:productservice.
:element.&smsdfp.
:elementlevel.v1r4.0
:elementservice.
:eelement.
:eproduct.
:audience.&sp.,&dbadm.
:taskgroup.&dbadmn.,&cust.,&apg.
:symbolfile.infotype
:symbolfile.audience
:symbolfile.tskgroup
:symbolfile.element Implementation of Step 2 (104) in Authoring System 800: After they have defined the context filters and map-level information in the manner described above, authors begin developing the structure of a task map 806 using chalkboard, paper-and-pencil, or any technique they choose. They then encode the tasks in the map GML 802, using the following tags:

1. :task.n to identify a task and placement of the task in the task hierarchy—therefore, its relationship to tasks n+1 and n−1. The type of relationship (whole-part or group-member) is not explicitly identified in authoring system 800.
2. :taskname., :action., and :subject. to define each task
3. :etask.

The author runs MAPCONV program 804 against the map GML 802 to generate a graphical version 806 of the map (step 704). Writers can iteratively refine their maps 806, update the map GML 802, and rerun the MAPCONV program 804. MAPCONV program 804 may be implemented in any suitable manner known to the art; the particulars of its implementation form no part of the present invention and are hence not described.

Figure 9:
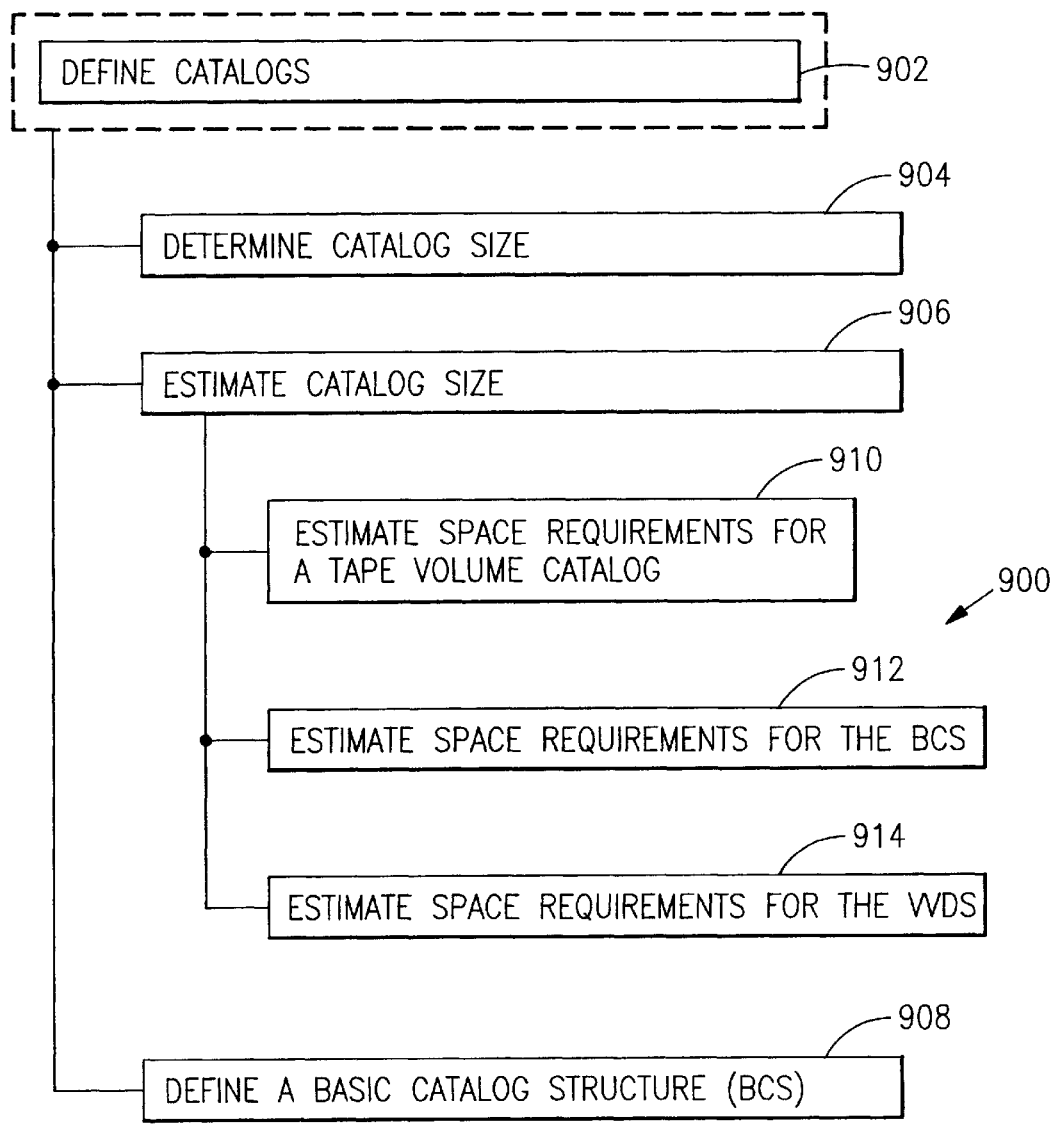
FIG. 9 illustrates the tasks and task structure built by the MAPCONV program from task definitions in the map GML used in the first embodiment.

FIG. 9 shows a task map 900 containing a root task 902, subtasks 904–908 that are subordinate to root task 902, and subtasks 910–914 that are subordinate to subtask 906. As noted above, the identifiers following the :task. tags indicate the hierarchical relationships between tasks 902–914. Table 7 below shows the task definitions that result in the map 900; these definitions are appended to the context filters and map-level information shown in Table 6 in the map GML 802 under construction.

TABLE 7

:task.1
:taskname.Define Catalogs
:action.Define
:subject.Catalogs
:etask.
:task.1.1
:taskname.Determine Catalog Size
:action.Determine
:subject.Catalog Size
:etask.
:task.1.2
:taskname.Estimate Catalog Size
:action.Estimate
:subject.Catalog Size
:etask.
:task.1.2.1
:taskname.Estimate Space Requirements for a Tape Volume Catalog
:action.Estimate
:subject.Space Requirements,Tape Volume Catalog
:etask.
:task.1.2.2
:taskname.Estimate Space Requirements for the BCS
:action.Estimate
:subject.Space Requirements,Basic Catalog Structure (BCS)
:etask.
:task.1.2.3
:taskname.Estimate Space Requirements for the VVDS
:action.Estimate
:subject.Space Requirements,VVDS (VSAM Volume Data Set)
:etask.
:task.1.3
:taskname.Define a Basic Catalog Structure (BCS)
:action.Define
:subject.Basic Catalog Structure (BCS)
:etask.
:emap.

Implementation of Step 3 (106) in Authoring System 800: To enable identification of task intersections between an author's work and the work of other authors, the author runs MAPDB program 808 to populate the relational database 810 (containing tables such as shown in FIGS. 4–5) with data from the author's map GML 802 (step 706). MAPDB program 808, like MAPCONV program 804, may be implemented in any suitable manner known to the art; the particulars of its implementation form no part of the present invention.

The author then runs predefined SQL queries against the database 810 to obtain a report of possible intersections between the author's task definitions and other task definitions in the database (step 708). Optionally, the author can select context filter values that will limit the scope of the search for possible task intersections. For example, when multiple products for different operating systems are included in the database, the author can restrict the search to other maps assigned a product filter of "OS/390."

The author then works with other authors to resolve task intersections (step 710) and updates common symbol files for task intersections accordingly (step 712). If the authors determine that a common task definition is indeed a task intersection, the authors assign a symbol to the task name; and define the symbol in a common taskname symbol file. Similarly, common subjects and common actions, used in the task definition, are assigned symbols that are defined in common action and subject symbol files. The use of symbols for intersections also ensures consistency in the intersecting terms. The authors identify the relevant symbol files in :symbolfile. tags in the map GML 802.

The authors then rerun the MAPDB program 808 to repopulate the database 810. (The program deletes all database entries associated with each mapid in the map GML 802; and then rebuilds entries for that mapid.) The program 808 generates an identifier for the task name, assigns the same identifier to each taskname identified by the same symbol, and tracks in which maps 806 the intersecting task occurs.

Implementation of Steps 4 (108) and 5 (110) in Authoring System 800:

In steps 4 and 5, the author codes map GML 802 to identify articles 816 that document tasks and the information type or subtype of each article (step 714).

In the existing authoring system, different elements of a softcopy book 818 can be assigned identifiers. Authoring system 800 contemplates links from a task in a map to headings, tables, or figures in a softcopy book 818.

To identify an article 816 that documents a task in the author's map 806, the author specifies the identifier of a heading, table, or figure in the softcopy book 818 in one of the following map GML tags:

:hdrefid. (for an article 816 that is a heading)
:trefid. (for an article 816 that is a table)
:figrefid. (for an article 816 that is a figure)

The :hdrefid., :trefid., or :figrefid. are specified as part of the task definition (between :task. and :etask.) to associate the article 816 with the task it documents.

The softcopy book 818 that contains the referenced article is identified in the :docdesc. tag in the map GML 802. The author can, optionally, associate a :docdesc. tag with a specific :hdrefid., :trefid., or :figrefid. tag to link to different books 818 from the same map 806, depending on the scope of the author's assignment. A :docdesc. tag specified at the beginning of a map 806 will establish a default document in which article identifiers exist.

Writers commonly exploit heading, table, and figure identifiers within a book 818 to create cross-references. Therefore, writers are working with a set of identifiers with which they are familiar. Article identifiers need be unique only within a document 818 (identified by a :docdesc. tag); authors ensure uniqueness of identifiers within a document within the existing authoring system.

Article identifiers are associated with the type of information they provide by placing the :hdrefid., :trefid., or :figrefid. map GML tag between a :infotype. and :einfotype. tag in the map GML 802. Authors identify the type of information as a predefined symbol on the :infotype. tag; and identify the common symbol file for information types in a :symbolfile. tag in the map GML 802. Table 2 above shows the typical contents of an infotype symbol file.

Table 8 below illustrates the mark-up of the map GML 802 to identify three articles 816 that document the task "Determine catalog size"; this mark-up would be made at the indicated locations in the map GML 802 under construction containing the listings in Tables 6–7. The first article 816 is an introduction; the second article 816 describes the processing (how it works); and the third article 816 is a procedure on how to do it. The articles 816 exist in the softcopy book 818 identified by the :docdesc. tag.

TABLE 8

:map.smap01
.
.
:docdesc id=idac100 num='SC26-4914'.
.
.
:symbolfile.infotype
:task.1.1
:taskname.Determine Catalog Size
.
:infotype.&intro.
:hdrefid.catsze
:einfotype.
:infotype.&works.
:hdrefid.spcass
:einfotype.
:infotype.&proc.
:hdrefid.bcscica
:einfotype.
:etask.
.
.
:emap.

It is possible (especially when maps 806 are developed for a large body of existing information) that more than one article 816 might provide the same type of information for the same task. For example, three articles 816 provide examples (information type of "example") for the task "define a basic catalog structure."

The map GML tag subtype. allows the author to define subtypes that distinguish between articles 816 of the same information type. There are no predefined subtypes. The author uses whatever phrases distinguish the articles 816.

Table 9 below illustrates the mark-up to identify three articles 816 that provide examples for the task "define a basic catalog structure". This mark-up would be made at the indicated locations in the map GML 802 under construction containing the listings in Tables 6–8.

TABLE 9

:task.1.3
:taskname.Define a Basic Catalog Structure (BCS)
.
.
:infotype.&xmp.
:subtype.ICF Catalog
:hdrefid.icfcat
:subtype.General ICF Tape Volume Catalog
:hdrefid.deftvc
:subtype.Specific ICF Tape Volume Catalog
:hdrefid.deftvs
:einfotype.
:etask.

The value of the information type tag (or subtype, if specified) becomes the source of the link 814 to the article 816 (the highlighted phrase in the map 806 on which a user clicks) when the user displays a map using the query interface 820. Using information type as the source of the link 814 provides a clue to the user about the content of the article 816 at the link destination, and allows both the author and the user to distinguish between multiple articles 816 documenting the same task from the same map 806.

Figure 10:
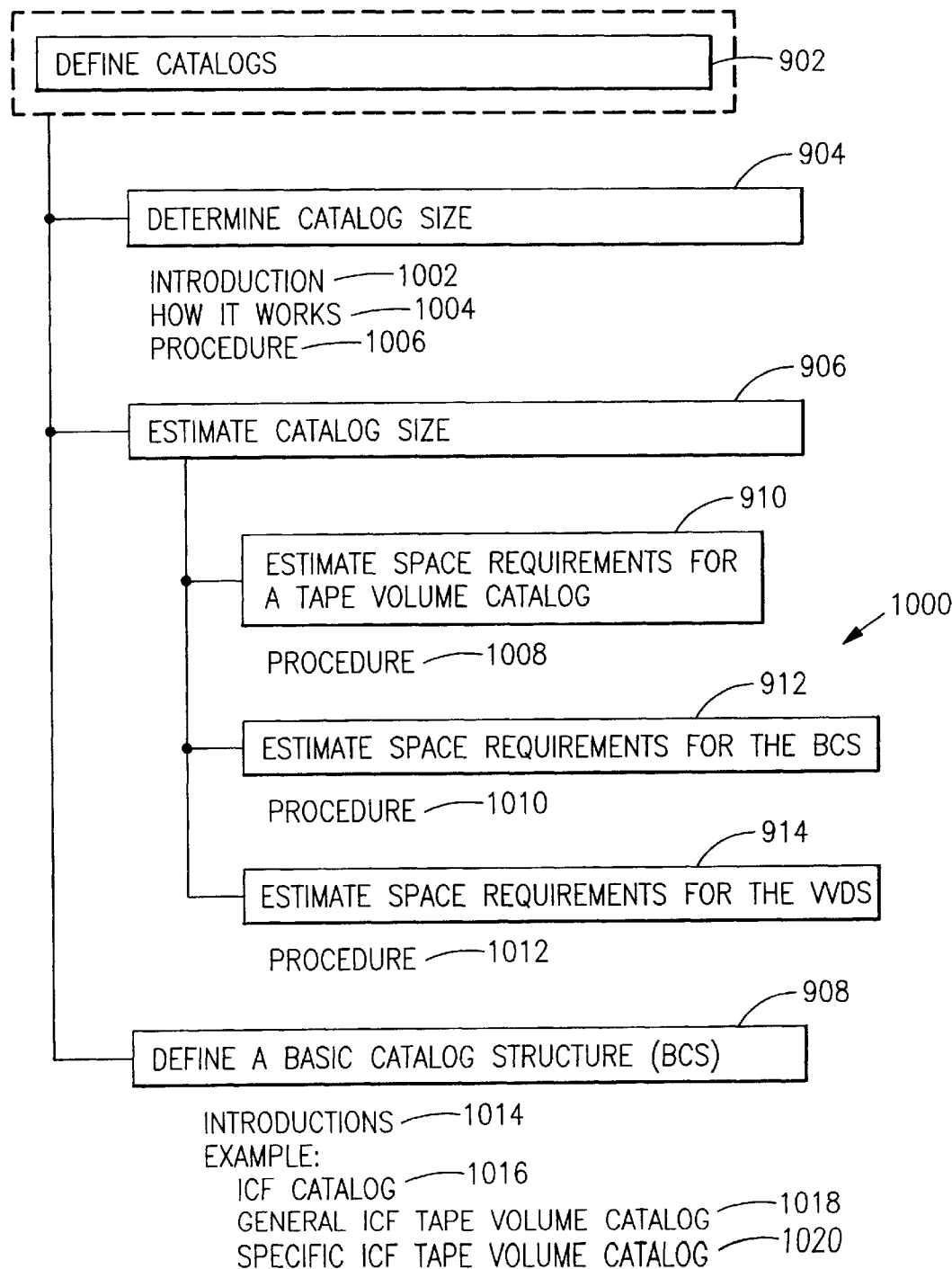
FIG. 10 illustrates a complete task map, including links, tasks, and task structure, generated by the MAPCONV program.

FIG. 10 shows a task map 1000 that is similar to task map 900 (FIG. 9) but includes links 1002–1020 to articles 816. Each information type or, if specified, subtype listed under a task box 902–914 is a link to an article 816 in a softcopy book 818.

MAPCONV program 804 generates the links 1002–1020 when it builds the map 1002 from the map GML 802.

Implementation of Step 6 (112) in the Authoring System 800:

In authoring system 800, the author specifies the query attributes in the map GML 802. When the author has identified the articles 816 that document the tasks in a map 806, the author runs the MAPDB program 808 to populate the relational database 810 with the data in the map GML 802 (step 716). (The program 808 first deletes any existing data associated with the mapid and then rebuilds the data for that map.) The author then runs predefined SQL queries against the database 810 to obtain a report of possible article intersections between the author's defined articles 816 and other articles 816 represented in the database 810 (step 718).

If the author determines that an article intersection is justified because of distinctions in the context filters of the maps 806 to which the articles 816 are attached, the author need do nothing. If the author determines that an article intersection does represent unnecessary duplication of information, the author works with other authors to resolve task intersections so that the authors of the intersecting articles 816 can reuse a single article (step 720). Either:

1. One author creates a link 814 to the other author's article 816. Thus author A may specify, in the map GML 802 for author A's map 806, the identifier (in the :hdrefid., :trefid., or &figrefid. tag) and document descriptor (in the :docdesc. tag) of author B's article 816 and document 818. Author A's map 806 for that article will then link to author B's article 816 in author B's document 818.
2. The authors may place the article 816 in a common library and both reuse it in their respective documents 818 via imbedding the article. Both authors are specifying the same article identifier (in the :hdrefid., :trefid., or : figrefid. tag) but the document descriptor (in the :docdesc. tag) of their own document 818.

The authors are responsible for communicating changes to the article 816; the authors can identify other users of an article 816 via queries of the database 810.

For changes that require a changed attribute value (for example, a new release of a product), an author creates a new version of the common article 816 in a new library. Intersections between the new version of the article 816 and other articles are found via the same process that identified the original article intersection.

Implementation of Step 7 (114) in Authoring System 800: In the existing authoring system that forms the basis for the authoring system 800 of the present invention, the articles 816 are delivered to users via softcopy books 818 (accessible via BookManager or, on the Internet, via BookServer). As already noted above, the authoring system 800 of the present invention integrates maps 806 with the currently delivered softcopy books 818 by creating a new softcopy book, Atlas 812, that contains all the maps that apply to a softcopy library. Typically, Atlas 812 would be accessible to users only as softcopy via query interface 820.

Book authors promote completed map GML 802 to a central library. The copyright date for each map 806 (:date. tag) identifies the date at which a map can be published. (Preferably, the map GML 802 itself is collected centrally, not the formatted maps 806 that are the output of the MAPCONV program 804, to provide for the capability of dynamically building maps based on :the task definitions in the map GML.)

The author of the Atlas 812 runs the MAPCONV program 804 against the map GML 802 to produce the maps 806 for the Atlas (step 722). The MAPCONV program 804 generates (1) the BookMaster tags that define the cross-book links 814 from the Atlas 812 to the books 818 in the softcopy library; and (2) a graphical depiction 806 of the map that integrates into the map the links 814 to articles 816 that document the tasks (as shown in FIG. 10). The author also runs the MAPDB program 808 if necessary to repopulate the database 810.

From the information an author provides within the scope of the author's assignment (usually within the scope of a single book 818), the program 804 automatically generates cross-book links 814 that will allow a user to link from the Atlas 812 to the books 818 in the softcopy library; the author of an individual book 818 need not create cross-book links to enable linking across book boundaries.

The author of the Atlas 812 creates the Atlas as a BookManager softcopy book of all maps 806 (step 724). The Atlas 812 and the softcopy books 818 to which it links may be placed on an Internet server and catalogued by BookServer.

Search and Navigation in Authoring System 800: As noted above, authoring system 800 contemplates a query interface 820 (accessed, e.g., via the Internet) that allows a user to:

1. Set and save profiles that identify context filter values of interest.
2. Search tasknames for a character string, optionally restricting the search to a specific product release, one or more specific elements, or a profile.
3. Sort the list of tasks that match the query by element or taskname.
4. Index the list of tasks that match the query (using the subjects involved in each task).
5. Open the map 806 that contains a task returned in response to the search argument.
6. Jump from the maps 806 to articles 816 in the softcopy library 818, via links 814.
7. Open the Atlas 812 as a softcopy book.

Searches are conducted against the database 810 (subject and task name), not against the Atlas 812 itself. By intelligent populating of the database 810, inappropriate hits (such as a task name in one map that represents a link to another map) are eliminated.

Second Embodiment

Figure 11:
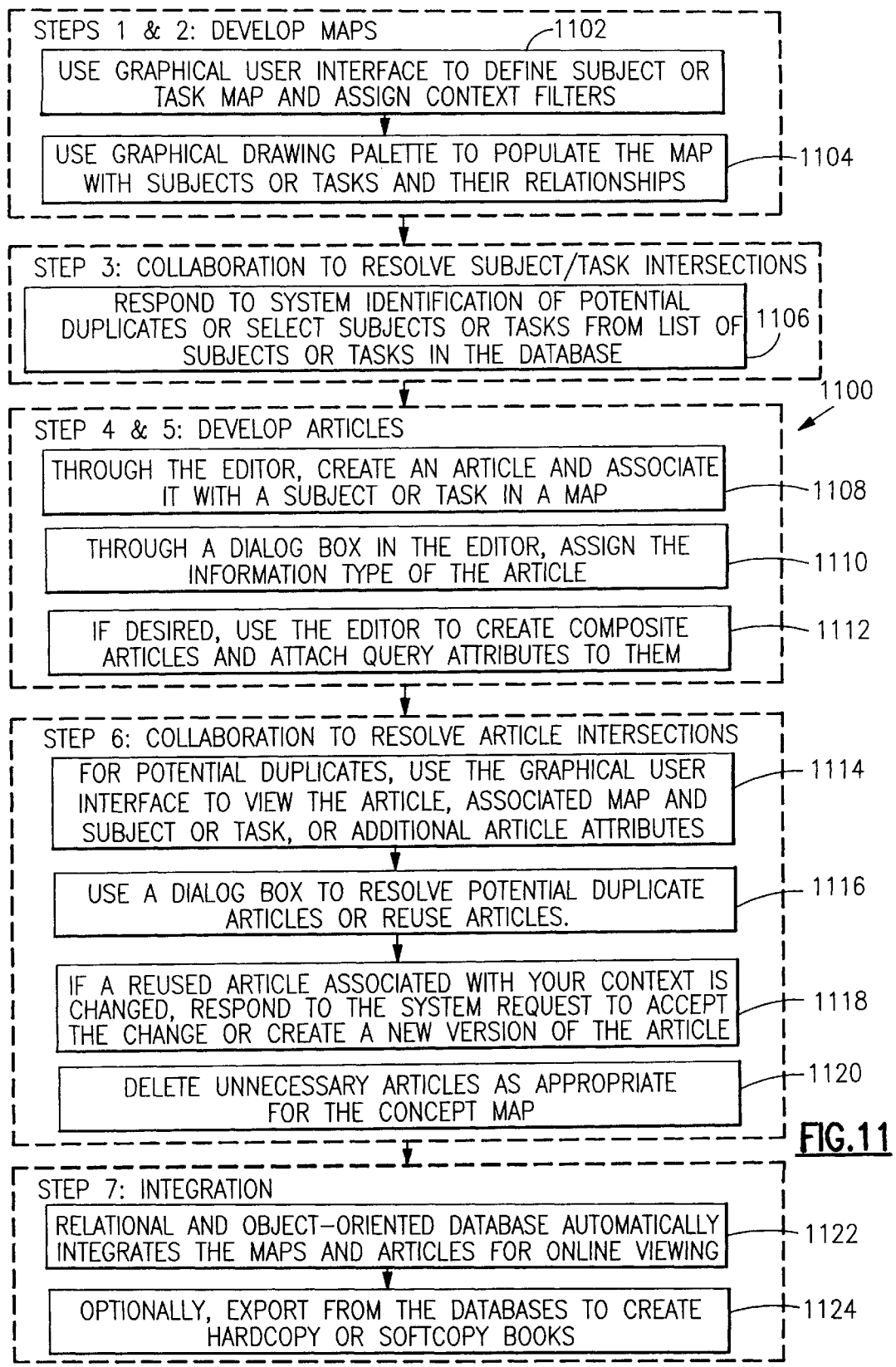
FIG. 11 illustrates the general authoring process as applied in a second embodiment.
Figure 12:
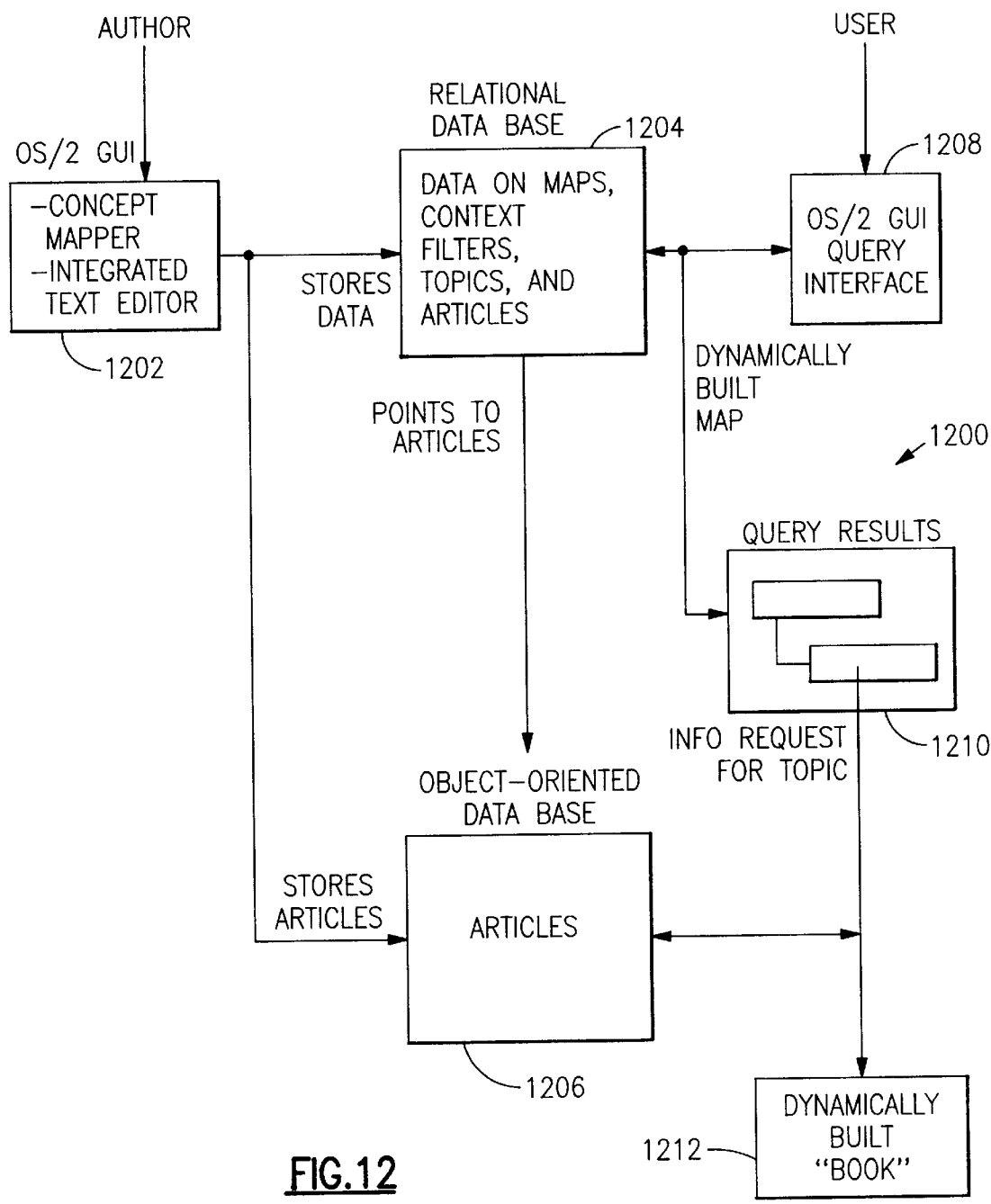
FIG. 12 illustrates the primary components of the second embodiment and their structure.

FIG. 11 outlines the general procedure 100 as performed in a second authoring system 1200 shown in FIG. 12. Preferably, the components of authoring system 1200, like those of authoring system 800, are implemented as software executing on a suitable computer platform.

Implementation of Step 1 (102) in Authoring System 1200: Authoring system 1200 contemplates a graphical user interface (hereinafter "author interface") 1202 for allowing an author to develop maps directly rather than via markup language as in system 800. Author interface 1202 allows authors to define subject and task maps (FIG. 6). Thus, the author may assign a name to the map in a dialog box and assign context filter values (FIG. 6) to the map by selecting appropriate values from a drop-down list of predefined values for each context filter (step 1102).

The context filter values used in authoring system 1200 may be similar or identical to those used in authoring system 800. Preferably, authoring system 1200 includes the ability for administrators to define new context filter values using the author interface 1202, which are then immediately selectable by all authors using the authoring system.

Implementation of Step 2 (104) in Authoring System 1200: Authoring system 1200 contemplates a graphical drawing palette provided by author interface 1202 from which authors use computer mouse manipulation (for example, drag and drop) to populate the concept map (step 1104). The drawing palette may contain icons appropriate for subject or task maps, depending upon which choice the author made in Step 1 (102). Preferably, the two map types are distinguished by the size and shape of the boxes created for subjects and tasks: e.g., subject boxes may be square while task boxes may be elongated rectangles.

For subject maps, the drawing palette may have icons for creating subject boxes, group-member relationships, whole-part relationships, and garden-variety relationships. For task maps, the drawing palette may have icons for creating tasks, group-member relationships, and whole-part relationships. Both drawing palettes may have an eraser icon used to delete map elements.

Author interface 1202 may have dialog boxes for supplying subject names and garden-variety relationship names in subject maps. Subject names and garden-variety relationship names may appear in the display of the subject map, while group-member and whole-part relationships may be displayed with conventional icons used in many object-oriented diagrams. For task maps, author interface 1202 may provide dialog boxes to supply task names, actions, and subjects involved in the tasks. Preferably, only task names appear in the display of the task map—the actions and subjects can be viewed by recalling the dialog box in which they were originally defined. Group-member and whole-part relationships may be displayed with conventional icons used in object-oriented diagrams.

Implementation of Step 3 (106) in Authoring System 1200: If the author defines new subjects or tasks, author interface 1202 preferably immediately compares the definition of the subject or task with data currently in the database 1204 and notifies the author if a potential intersection exists. Additionally, author interface 1202 may mark each potential intersection (e.g., with an asterisk) in all map displays until the author resolves the potential intersection by confirming that it is an intersection or by indicating that the author's entry should be considered a new subject or task (step 1106).

Preferably, the author can also select subject and task names from a list of subject and task names that already exist in the database 1204. Selecting an existing subject or task name automatically identifies that the author's subject or task is the same as that subject or task already stored in the database 1204.

Author interface 1202 generates and assigns an identifier for each unique subject or task and tracks those maps in which the intersecting subject or task occurs. To help the author resolve potential intersections, author interface 1202 preferably allows the author to view all maps in which the subject or task in question occurs.

Implementation of Step 4 (108) in Authoring System 1200: Authoring system 1200 integrates a text editor into author interface 1202. The writer either:

1. Selects a subject or task within a map to be documented and invokes the editor (via a menu selection).
2. Invokes the editor and selects, via dialog boxes, a subject or task and the map containing that subject or task as attributes of the article being written.

In either case, author interface 1202 assigns an article identifier to the article and associates that article identifier with the subject or task and with the map containing that subject or task (step 1108). The author does not explicitly work with the identifiers themselves. The author interface 1202 generates the identifier and maintains the association.

Implementation of Step 5 (110) in Authoring System 1200: It is contemplated that the editor integrated into the author interface 1202 supports assignment of an information type (step 1110). When an author creates or accesses an article, the author can select the option to "assign query attributes". Author interface 1202 then displays a dialog box from which the author selects the information type to be assigned to the article. The supported information types are controlled by means of the information types included in the list from which the author selects.

It is also contemplated that authoring system 1200 supports composites: one article that consists of other articles, each of which is assigned query attributes (step 1112). Through composites, authors can build larger information structures, assembling articles like building blocks. The query attributes assigned to a composite article apply to the composite as a whole; the attributes are not an accumulation of all the attributes assigned to articles included in the article being attributed.

For example, an article that is a procedure (the information type) to install an I/O device (the task) might include an article that provides an introduction to device attachment. That article, in its own right, is assigned an information type of "introduction" and a subject of "device attachment". The composite article that describes how to install an I/O device is attributed only for the query that the entire composite article answers: an information type of "procedure" for the task "install an I/O device". This convention provides the following benefits:

1. The smallest article possible is retrieved in answer to a user's query. In the preceding example, a user query for an introduction to device attachment will retrieve only the one article, not also the article that imbeds it.
2. If an article is imbedded in more than one article, the user has additional navigational choices. In addition to navigating within and across maps that include the query subject or task, the user can navigate from a retrieved article to any composite article in which it is included. For example, the article that introduces device attachment could be in a composite article on "installing an I/O device" and in a composite article about "I/O configuration", each of which provides a different point of view for the user's navigation.

Implementation of Step 6 (112) in Authoring System 1200: Preferably, author interface 1202 identifies intersections automatically, as soon as an author defines an article and assigns query attributes to it, and issues a message identifying the article intersections. The author can then view the intersecting article, view the map to which an intersecting article is attached, and view additional attributes associated with the intersecting article (such as context filters associated with the map to which the article is attached) (step 1114).

The author may reuse an article via simple selections on a dialog box (step 1116). If the author chooses not to reuse an existing article, author interface 1202 assigns a unique identifier to the author's article. The new and existing articles can intersect future articles but the resolved article intersections will not be presented to the author again.

If an author chooses to reuse an existing article, author interface 1202 associates the author's query attributes with the article to be reused. The content of the article, residing in the object-oriented database 1206, is now associated with each map in which it is used, via the multiple sets of query attributes that are associated with the article and that are stored in the relational database 1204. FIG. 5 shows a conceptual view of the way the database 1204 stores a reused article. The table entry indicated by 402 shows two sets of query attributes 402a, 402b for article 010.

If an author updates the content of an article associated with multiple sets of query attributes, authoring system 1200 saves the updated article as a new instance of the article and notifies other authors who reused the original article that the reused article has been changed (step 1118). If other reusers of the article reject the changes, authoring system 1200 maintains the original unchanged version of the article and its association with the query attributes supplied by the authors who rejected the changes.

If other reusers of the article accept the changes, authoring system 1200 associates the new instance of the article with the query attributes supplied by the authors who accept the changes.

If an author "deletes" an article, authoring system 1200 deletes the query attributes that associate that article with the author's map (step 1120). Authoring system 1200 then checks whether additional sets of query attributes exist for the article. If additional sets do exist, processing is complete: the article itself will not be deleted as long as other sets of query attributes are associated with the article. If no other sets of query attributes exist for the article, the program moves the article to archived storage. The article, since it has no query attributes associated with it, is no longer accessible via authoring system 1200.

Implementation of Step 7 (114) in Authoring System 1200: In authoring system 1200, map data, attribute data, and article data are stored in a relational database 1204 that points to articles stored in an object-oriented database 1206. The authors' work is integrated via storage in the same physical (centralized) or logical (distributed) object-oriented database 1206. As such, the maps and articles are ready for online viewing and navigation (step 1122).

The traditional book paradigm is an optional output of the process via the definition of composites; traditional softcopy delivery is supported by building those composites as Book-Manager softcopy books (step 1124).

Search and Navigation in Authoring System 1200: Authoring system 1200 has a graphical user query interface 1208 ("query interface" hereinafter) that may be similar to query interface 820 in authoring system 800. It is contemplated that query interface 1208 provides the following options for users:

1. Open a map, selecting the map from a list that can be filtered by profile settings.
2. Open a composite article designated as a book, selecting the "book" from a list that can be filtered by profile settings.
3. Search "books" for a character string, optionally specifying a profile that sets the scope of the search.

The search is a traditional BookManager search against the composite articles designated as "books" that satisfy the context filter values set via the profile the user selects.

4. Search maps for a character string, optionally specifying a profile that sets the scope of the search.

Query interface 1208 searches subject and task names in the maps stored in relational database 1204 and dynamically builds a map 1210, based on the search results, that integrates subjects or tasks related to the query subject or task from the maps in which the query subject or task occurs.

From the map 1210, the user can:
  a. Request information. For any subject or task for which information is requested, the system builds a dynamic book 1212 (with a dynamically built table of contents containing article titles and a dynamically built index based on query attributes assigned to articles) containing the articles associated with the subject or task that satisfied the user's query.
  b. Filter the map 1210, by selecting more restrictive context filter values.
  c. Navigate the map 1210, by expanding the "neighborhood" view of a displayed subject or task to include additional subjects or tasks related to the selected subject or task.
  d. Expand the map 1210, by deselecting context filter values.

Conclusion

While specific embodiments have been shown and described, it will be apparent to those skilled in the art that other embodiments are possible and that various modifications may be made to the disclosed embodiments without departing from the invention as defined in the appended claims.

What is claimed is:

1. A computer-implemented method of facilitating reuse of previously created articles, comprising:
   storing attribute data specifying a topic and information type for each of a plurality of previously created articles;
   receiving attribute data from an author specifying a topic and information type for a contemplated article; and
   comparing the received attribute data with the stored attribute data to identify previously created articles having the same topic and information type as said contemplated article;
   wherein said user context specifies a task group.

2. A computer-implemented method of facilitating reuse of previously created articles, comprising:
   storing attribute data specifying topic and information type for each of a plurality of previously created articles;
   receiving attribute data from an author specifying a topic and information type for a contemplated article; and
   comparing the received attribute data with the stored attribute data to identify previously created articles having the same topic and information type as said contemplated article; and
   receiving input from said author specifying whether to reuse any of said previously created articles that have been identified as having the same topic and information type as said contemplated article.

3. The method of claim 2, further comprising the step of:
   in response to an input from said author specifying reuse of a previously created article, associating the attribute data received from said author with said previously created article.

4. A computer-implemented method of facilitating reuse of previously created articles, comprising the steps of:

storing attribute data specifying a set of query attributes for each of a plurality of previously created articles;

receiving attribute data from an author specifying a set of query attributes for a contemplated article;

comparing the received attribute data with the stored attribute data to identify previously created articles having query attributes that intersect with those of said contemplated article; and receiving input from said author specifying whether to reuse any of said previously created articles that have been identified as having intersecting query attributes.

5. The method of claim 4, further comprising the step of:

in response to an input from said author specifying reuse of a previously created article, associating the set of query attributes received from said author with said previously created article.

6. The method of claim 4, further comprising the step of:

in response to an input from said author specifying no reuse of a previously created article, assigning a unique identifier to said contemplated article.

7. The method of claim 4 wherein the received query attributes include topic name.

8. The method of claim 4 wherein the received query attributes include information type.

9. A program storage device readable by a machine, tangibly embodying a program of instructions executable by the machine to perform the method steps of claim 4.

10. The method of claim 4 wherein said stored attribute data and said received attribute data are selected from a predefined set of attribute data.

11. A computer-implemented method of authoring information about a structured domain, comprising:

storing one or more concept maps, each of which identifies topics documented by a set of articles within a particular domain and relationships between said topics; and storing a set of context filters for each of said concept maps that specify user attributes of said map;

receiving input from an author defining a proposed new topic;

comparing said input with existing topics identified by said concept maps to determine whether said proposed new topic may duplicate an existing topic.

12. A computer-implemented system for facilitating reuse of previously created articles, comprising:

means for storing attribute data specifying a set of query attributes for each of a plurality of previously created articles;

means for receiving attribute data from an author specifying a set of query attributes for a contemplated article;

means for comparing the received attribute data with the stored attribute data to identify previously created articles having query attributes that intersect with those of said contemplated article; and means receiving input from said author specifying whether to reuse any of said previously created articles that have been identified as having intersecting query attributes.

13. The computer-implemented system of claim 12 wherein said stored attribute data and said received attribute data are selected from a predefined set of attribute data.

* * * * *

UNITED STATES PATENT AND TRADEMARK OFFICE
CERTIFICATE OF CORRECTION

PATENT NO. : 5,956,708
DATED : September 21, 1999
INVENTOR(S) : D. Dyko, et al.

It is certified that error appears in the above-identified patent and that said Letters Patent is hereby corrected as shown below:

Column 22 Line 45 after "contemplated article;" insert new paragraph
-- wherein said attribute data also specifies a user context for each of said articles, said received attribute data and said stored attribute data being used to identify previously created articles having the same topic, information type and user context as said contemplated article;

Signed and Sealed this

Twelfth Day of September, 2000

Attest:

Q. TODD DICKINSON

*Attesting Officer*     *Director of Patents and Trademarks*

Disclaimer 5,956,708 — Denise Y. Dyko, Millbrook; Christopher J. Hastings, Rhinebeck, both of NY; Richard Sobiesiak, Wollowdale, Canada; Ronald A. Wendt, Red Hook, NY. INTEGRATION OF LINK GENERATION, CROSS-AUTHOR USER NAVIGATION, AND REUSE IDENTIFICATION IN AUTHORING PROCESS. Patent dated Sep. 21, 1999. Disclaimer filed Oct. 4, 2006, by the assignee, International Business Machines Corporation.

Hereby enters this disclaimer to all claims of said patent.

*(Official Gazette February 27, 2007)*